United States Patent [19]
Hicks

[11] Patent Number: 5,358,458
[45] Date of Patent: Oct. 25, 1994

[54] PLANETARY GEAR UNITS

[75] Inventor: Raymond J. Hicks, Powys, United Kingdom

[73] Assignee: Massey-Ferguson Services, N.V., Netherlands Antilles

[21] Appl. No.: 842,376

[22] PCT Filed: Aug. 5, 1991

[86] PCT No.: PCT/GB91/01330
§ 371 Date: Apr. 1, 1992
§ 102(e) Date: Apr. 1, 1992

[87] PCT Pub. No.: WO92/03670
PCT Pub. Date: Mar. 5, 1992

[30] Foreign Application Priority Data
Aug. 15, 1990 [GB] United Kingdom ............... 9017921

[51] Int. Cl.⁵ .................................. F16H 37/06
[52] U.S. Cl. .................... 475/269; 475/282; 475/283; 475/317; 475/311
[58] Field of Search ............ 475/269, 282, 283, 317, 475/311

[56] References Cited
U.S. PATENT DOCUMENTS

| | | | |
|---|---|---|---|
| 3,308,687 | 3/1967 | Borman, Jr. | 475/283 X |
| 3,877,320 | 4/1975 | Iijima | 475/282 X |
| 4,089,238 | 5/1978 | Forster et al. | 475/282 X |
| 4,334,440 | 6/1982 | Fonck | 475/317 X |
| 4,836,052 | 6/1989 | Iwanaga et al. | |
| 5,062,823 | 11/1991 | Ra et al. | 475/317 X |

FOREIGN PATENT DOCUMENTS

| | | |
|---|---|---|
| 469881 | 8/1937 | United Kingdom . |
| 694861 | 7/1953 | United Kingdom . |
| 1559492 | 1/1980 | United Kingdom . |
| 2107007 | 4/1983 | United Kingdom . |

Primary Examiner—Rodney H. Bonck
Assistant Examiner—Daniel Wittels
Attorney, Agent, or Firm—MacMillan, Sobanski & Todd

[57] ABSTRACT

A planetary gear unit made up of a number of inter-connected co-axial three element planetary gear trains (12, 13) each including a sun (15, 19) a planet carrier (17, 21) and an annulus (14, 18). One (12) of the planetary gear trains is a dominant train with a first element (14) connected to an input member (10) of the unit and a second element (17) connected to an output member (11) of the unit. The remaining train or trains (13) of the unit are connected to the third element (15) of the dominant train to vary, by the use of associated clutches (C1, C2, C3, C4) acting between elements of the trains and ground, the direction and speed of rotation of the third element (15), thus providing a number of overall gear ratios from the unit.

13 Claims, 4 Drawing Sheets

| RATIO SELECTED | CLUTCH STATUS X=ENGAGED O=DISENGAGED | | | |
|---|---|---|---|---|
| | C1 | C2 | C3 | C4 |
| A | X | X | O | O |
| B | X | O | X | O |
| C | O | X | O | X |
| D | O | O | X | X |

| OUTPUT/INPUT RATIO SELECTED | CLUTCH STATUS | | | |
|---|---|---|---|---|
| | C1 | C2 | C3 | C4 |
| 1·618 | O | X | O | X |
| 1 | O | O | X | X |
| 0·618 | X | X | O | O |
| 0·381 | X | O | X | O |

| CLUTCHES ENGAGED | INPUT/OUTPUT RATIO | INPUT PATH | OUTPUT PATH | REACTION MEMBER | BYPASS |
|---|---|---|---|---|---|
| C1,C5 | 1/1·7548 ($1/1·3247^2$) | 102,203 | 103 | 202 | FROM INPUT |
| C1,C3 | 1/1·3247 ($1/1·3247^1$) | 102,203 | 103 | 302 | FROM INPUT |
| C1,C2 | 1/1 ($1/1·3247^0$) | — | LOCK UP | — | NONE |
| C4,C5 | 1·3247/1 ($1/1·3247^{-1}$) | 102 | 103 | 101 | NONE |
| C3,C4 | 1·7548/1 ($1/1·3247^{-2}$) | 102 | 103,302 | 203 | TO OUTPUT |
| C2,C4 | 2·3246/1 ($1/1·3247^{-3}$) | 102 | 103,202 | 203 | TO OUTPUT |

| CLUTCHES ENGAGED | INPUT/OUTPUT RATIO | INPUT PATH | OUTPUT PATH | REACTION MEMBER | BYPASS |
|---|---|---|---|---|---|
| C7, C5 | 1/2.3246 ($1/1.3247^3$) | 402, 102 | 103 | 202 | FROM INPUT |
| C1, C5 | 1/1.7548 ($1/1.3247^2$) | 102, 203 | 103 | 202 | FROM INPUT |
| C1, C6 | 1/1.3247 ($1/1.3247^1$) | 102, 203 | 103 | 302 | FROM INPUT |
| C1, C2 | 1/1 ($1/1.3247^0$) | — | LOCK UP | — | NONE |
| C4, C5 | 1.3247/1 ($1/1.3247^{-1}$) | 102 | 103 | 101 | NONE |
| C3, C4 | 1.7548/1 ($1/1.3247^{-2}$) | 102 | 103, 302 | 203 | TO OUTPUT |
| C2, C4 | 2.3246/1 ($1/1.3247^{-3}$) | 102 | 103 202 | 203 | TO OUTPUT |
| C2, C8 | 3.0796/1 ($1/1.3247^{-4}$) | 102 | 103, 401, 202 | 402 | TO OUTPUT |

PLANETARY GEAR UNITS

BACKGROUND OF THE INVENTION

This invention relates to planetary gear units and particularly, though not exclusively, to such units for use in tractor transmissions.

Such units are well known for use in the input stages of the transmission of tractors or similar vehicles to provide two or more ratios which can be shifted between under full power without the need to disengage the main drive clutch of the transmission.

It is object of the present invention to provide an improved form of planetary gear unit which is capable of providing a number of substantially evenly-spaced and relatively closely grouped ratios.

SUMMARY OF THE INVENTION

Thus according to the present invention there is provided a planetary gear unit comprising a plurality of inter-connected co-axial three element planetary gear trains each including a sun, planet carrier and annulus, the gear unit being characterised in that one of said planetary gear trains is a dominant train with one element connected with an input member of the unit and a second element connected with an output member of the unit, the remaining train or trains of the unit being connected with the third element of the dominant train to vary, by the use of associated clutches acting between elements of the trains and ground, the direction and speed of rotation of the third element, thus providing a number of overall ratios from the unit.

One element of the or each remaining train is connected with the third element of the dominant train and the other two elements of the or each remaining train are selectively clutchable to ground or an element of another train.

In a four speed unit, the third element of the dominant train is connected with a first element of a second train, a first clutch is provided for clutching a second element of the second train to ground, a second clutch is provided for clutching a third element of the second train to ground, a third clutch is provided for clutching one of the second and third elements of the second train to one of the input or output members and a fourth clutch is provided for clutching the other of the second or third elements of the second train to the other of the input or output members, the arrangement being such that a first ratio is provided from the unit when said first and second clutches are engaged, a second ratio is provided when said first and third clutches are engaged, a third ratio is provided when said second and fourth clutches are engaged and a fourth ratio is provided when said third and fourth clutches are engaged.

In one arrangement, the annulus of the dominant train is connected with one of the input members, the carrier of the dominant train is connected with the other of the input or output members and the sun of the dominant train is connected to an element of the second train. In one arrangement, the sun of the dominant train is connected to the carrier of the second train.

In such an arrangement the first clutch may clutch the annulus of the second train to ground, the second clutch may clutch the sun of the second train to ground, the third clutch may clutch the sun of the second train to the input or output member connected to the carrier of the dominant train and the fourth clutch may clutch the annulus of the second train to the input or output member connected to the annulus of the dominant train.

In an alternative arrangement, the sun of the dominant train is connected with the sun of the second train.

In this alternative arrangement the first clutch may clutch the carrier of the second train to ground, the second clutch may clutch the annulus of the second train to ground, the third clutch may clutch the annulus of the second train to the input or output member connected to the carrier of the dominant traing, and the fourth clutch may clutch the carrier of the second train to the input or output member connected to the annulus of the dominant train.

Preferably the clutches are grouped together in two pairs, one clutch of each pair being spring-applied and automatically released when the other clutch of the pair is applied to provide a full powershift capability allowing ratio changes under full power.

Preferably the other clutch of each pair is applied by fluid pressure.

A planetary gear unit in accordance with the present invention is capable of providing a number of closely grouped gear ratios which, when teamed with an additional gearbox, provide a particularly suitable transmission for use in tractors.

For example, it is possible to arrange the total ratio variation for the planetary unit to be 1 to 2 in four substantially evenly spaced ratios. Thus by selecting the appropriate ratio in the additional gearbox, a tractor operator working in the field could have at his disposal, say, speeds in the range 3 to 6 kph or 5 to 10 kph so that it will be possible for him to achieve all the desired field working speeds for the particular task at hand by changing the operative ratio of the planetary unit without needing to change the ration in the additional gearbox. Since changes in the operative ratio of the planetary unit can be made under full power and do not require any disengagement of any main drive clutch this provides a particularly efficient unit for tractor work.

A six speed unit may be provided from three gear trains by connecting the annulus of the dominant train to one of the input and output members connecting the carrier of the dominant train with the other of the input and output members, connecting the sun of the dominant train to the suns of the second and third trains and connecting the annulus of the second train to an element of the third train, clutches being provided for clutching the carriers and annuli of the second and third trains alternatively to ground or to one of the input and output members.

An eight speed unit may be provided by adding a fourth train so the arrangement described in the preceding paragraph, this fourth train being of reversed star form with its carrier connected to the carrier of the second train and the sun of the fourth train connected to the annulus of the second train, additional clutches being provided for clutching the annulus and carrier of the fourth train to ground or to one of the input and output members to provide an eight speed unit.

BRIEF DESCRIPTION OF THE DRAWINGS

Several embodiments of the present invention as applied to part of a tractor transmission will now be described, by way of example only, with reference to the accompanying drawings in which.

DETAILED DESCRIPTION OF THE PREFERRED EMBODIMENTS

Figures 1, 3:
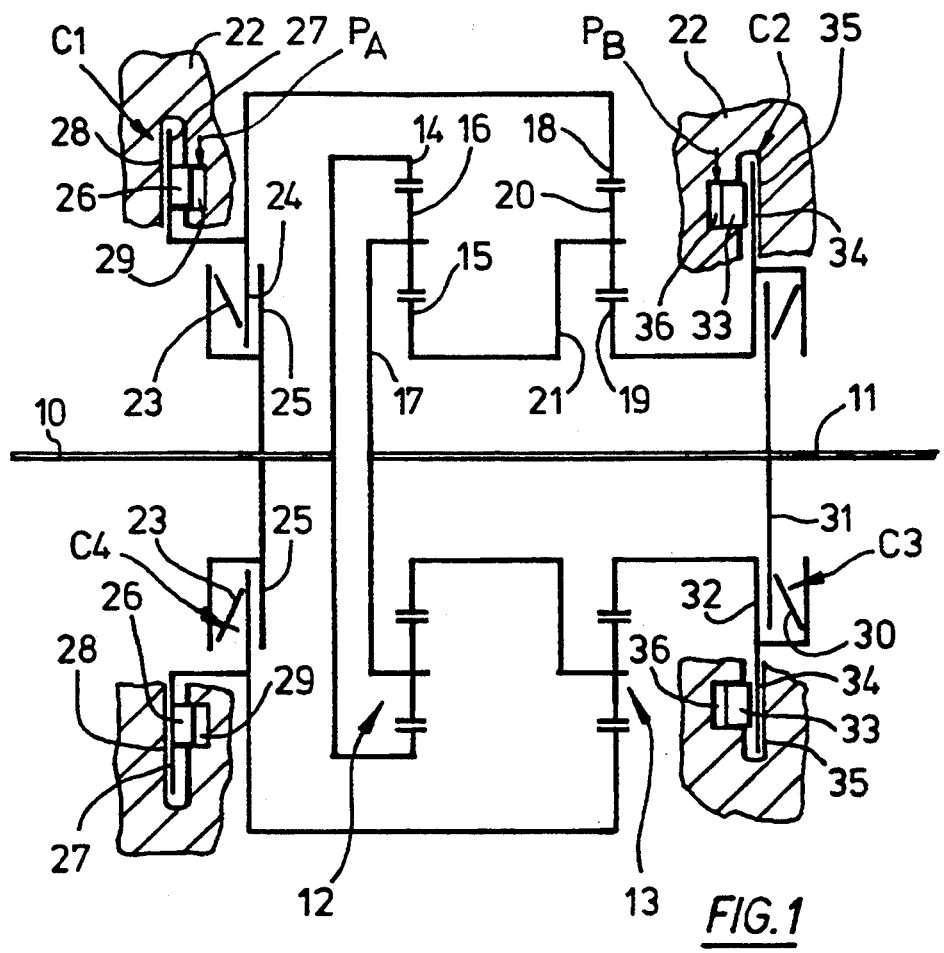
FIG. 1 is a diagrammatic section through a four speed planetary gear unit in accordance with the present invention.
FIG. 3 is a table indicating the engagement status of each clutch for each ratio of the planetary gear unit of FIG. 1.
Figure 2:
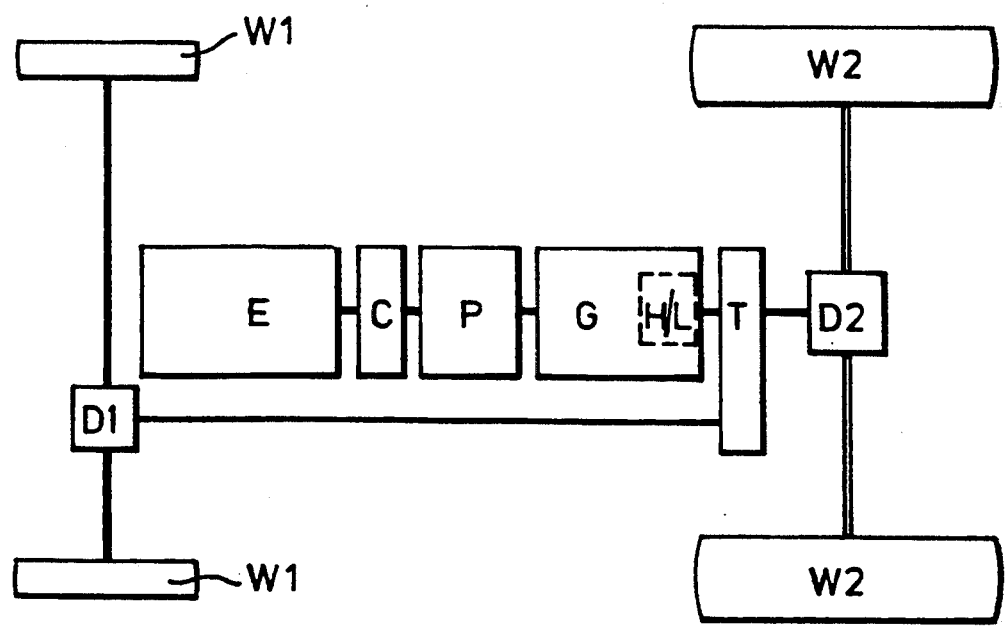
FIG. 2 is a diagrammatic representation of a tractor transmission including the planetary gear unit of FIG. 1.

Referring to FIGS. 1 and 2, these show diagrammatically a tractor transmission in which an engine E drives front and rear wheels W1 and W2 via differentials D1 and D2, a main clutch C, a planetary gear unit P in accordance with the present invention, a main gearbox G and a transfer box T. The main gearbox G will typically have four ratios and a forward/reverse direction selection train and may also include a high/low range facility indicated in dotted detail H/L in FIG. 2.

The planetary gear unit P has an input shaft 10 and a co-axial output shaft 11 and first and second planetary gear trains 12 and 13.

First planetary gear train 12 includes an annulus gear 14, sun gear 15 and planet gears 16 which mesh with annulus gear 14 and sun gear 15 and are carried on a planet carrier 17. In a similar fashion the second planetary gear train 13 includes an annulus gear 18, a sun gear 19 and planet gears 20 carried on a planet carrier 21.

The annulus gear 14 is connected to the input shaft 10, the planet carrier 17 is connected to the output shaft 11 and the sun gear 15 is connected to the planet carrier 21.

The planetary gear unit also includes four clutches. A first clutch C1 is provided which when engaged clutches the annulus gear 18 to housing 22 of the gear unit. A second clutch C2 which when engaged clutches the sun 19 to the housing 22. A third clutch C3 which when engaged clutches the sun 19 to the output shaft 11 and a fourth clutch C4 which when engaged clutches the input shaft 10 to the annulus gear 18.

The first and fourth clutches operate as a pair with the fourth clutch C4 being spring-engaged by a belleville spring 23 which presses friction elements 24 associated with the annulus 18 into contact with the friction elements 25 associated with the input shaft 10. The first clutch C1 is hydraulically engaged by an annular piston 26 which presses friction elements 27 associated with the annulus 18 into contact with elements 28 mounted on the housing 22. The first clutch C1 is engaged by applying a clutch engaging pressure PA to the chamber 29 behind the annular piston 26.

As will be appreciated, when the chamber 29 is pressurised to engage the first clutch C1, this automatically moves the friction elements 24 against the action of belleville spring 23 to disengage the fourth clutch C4.

In a similar fashion the second and third clutches C2 and C3 operate as a pair with the third clutch C3 being spring-engaged by a belleville spring 30 which brings clutch elements 31 and 32 respectively associated with the output shaft 11 and sun 19 into contact. The second clutch is hydraulically operated by an annular piston 33 which brines clutch elements 34 and 35 associated with the sun 19 and housing 22 into contact. Clutch C2 is engaged by applying a clutch actuating pressure PB to chamber 36 behind piston 33. As will be appreciated the engagement of the second clutch C2 also results in the disengagement of the third clutch C3 against the action of the belleville spring 30.

One of the advantages of a planetary gear unit in accordance with the present invention is that the number of teeth on the two annular gears 14 and 18 may be the same as may be the number of teeth on the two sun gears 15 and 19 and the meshing planet gears 16 and 20. This greatly simplifies the construction of the planetary gear unit and significantly reduces the manufacturing cost.

In the particular example under description the annulus gears 14 and 18 are provided with ninety-four teeth (the term 'a' used in the formulae below) and the sun gears 15 and 19 are provided with fifty-eight teeth (the term 's' in the formulae below).

The four operating ratios of the planetary gear unit are obtained as explained below. The various formulae quoted for the ratios obtained are the formulae which apply when the two annulus gears, the two sun gears and the meshing planet gears have the same number of teeth as referred to above.

A first ratio A is obtained when the first and second clutches C1 and C2 are engaged by applying hydraulic pressure to chambers 29 and 25 so that clutches C1 and C2 are engaged and clutches C3 and C4 are held at disengaged. In this condition, sun gear 19 and annulus 18 are both clutched to the housing 22 of the gear unit so that the second planetary gear train 13 is completely locked and the ratio RA is given by the formula RA=a/(s+a)=94/(58+94)=0.6184.

When in the A ratio the total power is transmitted through the first planetary gear train 12 while the torque at the first clutch C1 is 38.16% of the engine torque and the torque at clutch C2 is 23.54% of the engine torque.

A second ratio B is obtained when the first clutch C1 and the third clutch C3 are engaged. In this condition the sun 19 is connected to the output shaft 11 and the annulus 18 is connected to the housing 22. In this condition the sun gear 15 and planet carrier 21 rotate together and the ratio RB is given by the formula $$RB = \frac{1}{1 + s/a - \frac{s^2}{a(s+a)}}$$
$$= \frac{1}{1.3816}$$
$$RB = .7238$$

In range RB the torque of clutch C1 is 38.16% of the engine torque and the torque of clutch C3 is 23.54% of engine torque. Ratio B gives an output speed 17.04% faster than ratio A (ratio A is lower than ratio B by 14.56%).

A third ratio RC is obtained when clutch C2 is engaged and clutch C4 is engaged. In this ratio the annulus gear is connected with the input shaft 10 and sun gear 19 is connected with the housing 22. Consequently, the planet carrier 21 and sub gear 15 rotate at a speed of:

$$\frac{94}{(94+58)} = .6152 \times \text{the speed of input shaft 10.}$$

The ratio RC is given by the formula $$RC = \frac{(a+2s)a}{(s+a)^2}$$
$$= \frac{1}{1.1704}$$
$$= .8544$$

When in the ratio RC the torque of clutch C4 is 27.62% of the engine torque and the torque of clutch C2 is 17.04% of engine torque. Ratio RC gives an output speed 18.04% faster than ratio B (ratio B is lower than ratio C by 15.3%).

A fourth ratio RD is obtained when clutches C3 and C4 are engaged. In this condition the annulus gear 18 is connected to the input shaft 10 and the sun gear 19 is connected to the output shaft 11 so that the two planetary gear trains 12 and 13 are forced to rotate at the same speed to provide a direct drive ratio through the planetary unit thus ratio RD=1. In ratio RD the torque of clutch C4 is 27.62% of the engine torque and at clutch C3 17.04% of engine torque.

It will be appreciated that since ratio RD is engaged totally mechanically by belleville springs 23 and 30, the planetary gear unit will still function in ratio RD should there be an hydraulic or electrical failure. This is an important practical feature since it provides a "get you home" facility should the vehicle suffer a failure some distance from its base.

Thus the planetary gear unit provides four substantially evenly spaced and relatively closely grouped ratios 0.6184, 0.7238, 0.8544 and 1 which when mated with appropriately chosen ratios in the main gearbox G, provide a good spread of operating ratios for a tractor transmission.

An important feature of the planetary gear unit described above is that both hydraulically operated clutches C1 and C2 employ non-rotating pistons 26 and 33 respectively, which act to clutch parts of the planetary gear to the casing. This gives a shorter response time and, due to the use of non-rotating piston seals, improves reliability and gives a lower cost.

Although the present invention has been described above in relation to a four-speed underdrive unit, it will be appreciated that the unit could be driven in reverse (i.e. with the input shaft operating as the output shaft) to provide an overdrive unit. Also, although in the example described above the unit provides ratios which are all on the same side of unity, it is possible to provide a unit with ratios spread on both sides of unity.

Figure 4:
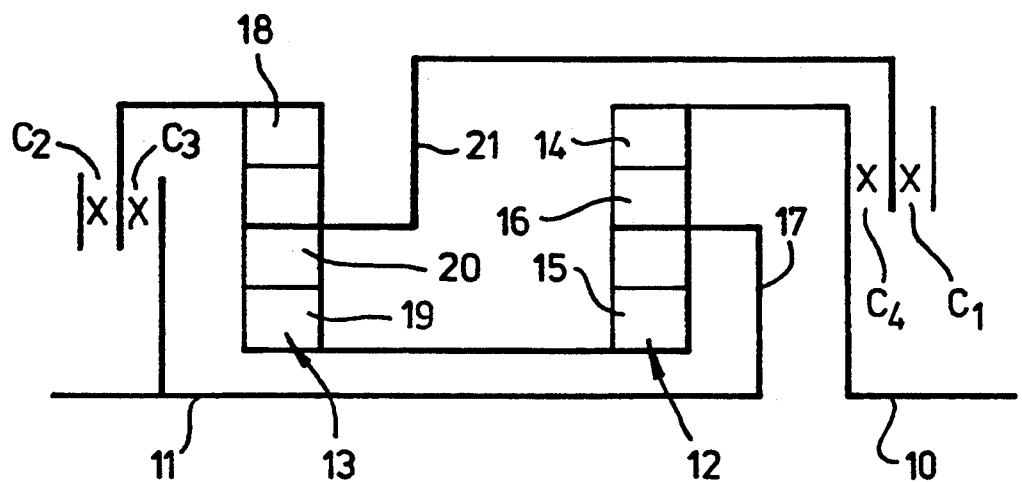
FIG. 4 in diagrammatic form an alternative four speed planetary gear unit in accordance with the present invention.
Figures 5, 6, 7:
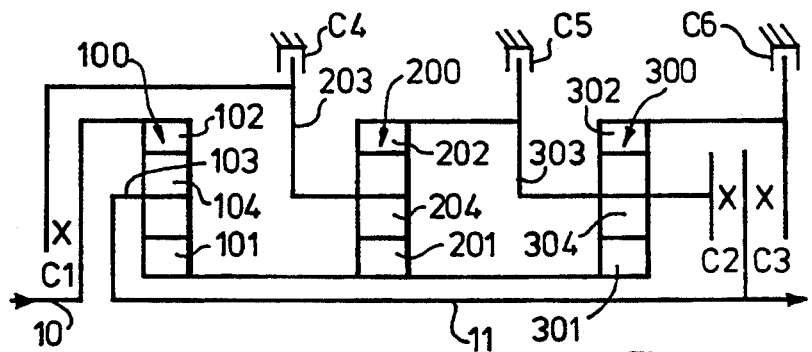
FIG. 5 is a table indicating the engagement status of each clutch for each ratio of the planetary gear unit of FIG. 4.
FIG. 6 shows in diagrammatic form a six-speed planetary gear unit in accordance with the present invention.
FIG. 7 is a table indicating the clutch engagement status and other data for each ratio of the planetary gear unit of FIG. 6.

FIG. 4 shows diagrammatically an alternative planetary gear unit in accordance with the present invention in which the two gear trains are interconnected via their sun gears. Such an arrangement allows the use of sun, planet and annulus gears with identical numbers of teeth in both gear trains and avoids recirculation of power. With an annulus/sun ratio of 1.618 output to input ratios $(1,618)^1=1.618$, $(1.618)^0=1$, $(1.618)^{-1}=0.618$ and $(1.618)^{-2}=0.382$ are provided. These ratios are obtained with the clutches operated as shown in FIG. 5.

Thus with clutches C2 and C4 engaged the reaction provided by primary sun wheel 15 is driven from the input 10 via secondary train 13 to provide a planetary step-up to give an output ratio above unity of 1.618. With clutches Ci and C3 engaged the primary sun 15 drives the output 11 via the secondary train 13 acting as a star reduction gear to provide an output ratio of 0.382 which is below the basic reduction ratio of 0.618 of the primary train. The unit therefore provides ratios either side of unity and either side of the basic ratio of 0.618.

The term clutch as used throughout this specification has been used to refer to a unit such as clutch C3 or C4, which connects together two rotatable members of the planetary gear for co-rotation or to a unit such as clutch C1 and C2 which connects a rotatable member of the planetary gear to ground (i.e. stops rotation or brakes the rotatable member).

To avoid recirculation of bypass power, it is necessary to ensure that there are no intermediate ratios between the basic ratio primary train ratio (when the primary train reaction member is fixed) and the unity/lock up condition. Also it is necessary to arrange to bypass from the input when stepping up above unity and to bypass to the output when stepping down below the basic reduction ratio. The converse applies if the power flow is reversed with the basic ratio being a step-up rather than a stepdown from input to output. It will be seen that FIG. 4 meets the above criteria.

FIG. 6 shows diagrammatically a six-speed version of a planetary gear unit in accordance with the present invention in which a primary gear train 100 is connected to secondary trains 200 and 300.

In the arrangement shown in FIG. 6 the suns 101, 201 and 301 of the three trains are interconnected and the input shaft 10 drives the annulus 102 of the primary train whilst the carrier 103, which carries the planets 104, is connected to the output shaft 11. The annulus 202 of secondary train 200 is connected to the carrier 303 of secondary train 300.

Clutch C1 is provided to clutch carrier 203 to the input 10, clutch C2 clutches carrier 303 to the output 11, clutch C3 clutches annulus 302 to output 11, clutch C4 clutches carrier 203 to ground, clutch C5 clutches annulus 202 and carrier 303 to ground and clutch C6 clutches annulus 302 to ground.

All three gear trains use the same diameter sun, planet and annulus gears with an annulus/sun ration of 3.0796 thus giving a basic solar reduction ratio of 1.3247/1 provided by a sun gear with 27 teeth and an annulus gear with 83 teeth. There is no recirculation of power in any ratio since the above discussed criteria for avoiding recirculation are met.

FIG. 7 displays the clutch combinations, input/output ratios, input and output paths, reaction members and bypass paths used in each ratio of the six-speed unit.

It is possible to obtain additional ratios from the unit of FIG. 6 not within the geometric progression shown in FIG. 7. For example, by engaging clutches C3 and C5.

Figures 8, 9:
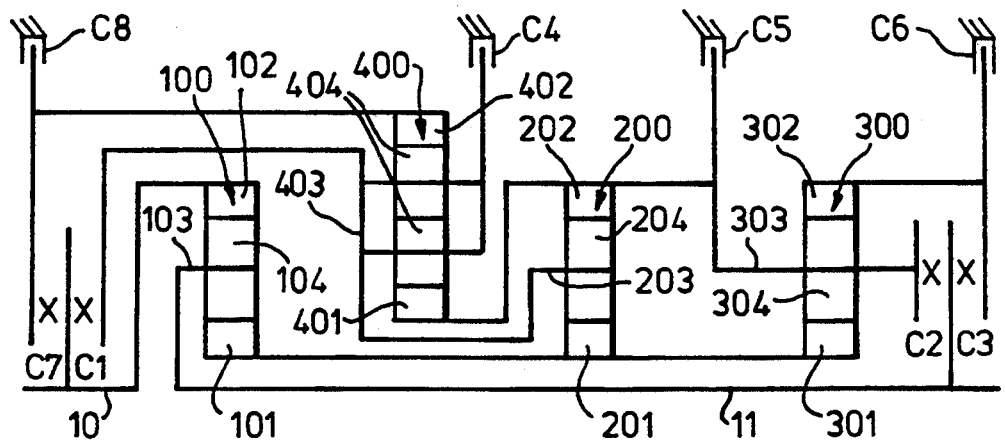
FIG. 8 shows in diagrammatic form an eight speed planetary gear unit in accordance with the present invention.
FIG. 9 is a table indicating the clutch engagement status and other data for each ratio of the planetary gear unit of FIG. 8.

FIG. 8 shows diagrammatically an eight speed version of a planetary gear unit in accordance with the present invention which is obtained by adding a fourth gear train 400 to the trains 100, 200 and 300 of FIG. 6. Train 400 is a reversed star train (i.e. it has two planet gears 404) acting between its sun 401 and annulus 402.

Carrier 403 of train 400 is connected to carrier 203 and sun 402 is connected to annulus 202. An additional clutch C7 is provided for clutching annulus 402 to input 10 and clutch C8 clutches annulus 402 to ground. Again all three gear trains use the same diameter sun, planet and annulus gears.

FIG. 9 displays the clutch combinations, input/output, ratios, input and output paths, reaction members and bypass paths used in each ratio of the eight speed unit. Again, additional ratios not within the geometric progression can be obtained from the unit of FIG. 8.

In the planetary units disclosed above, the geometrically disposed additional ratios either between unity and the basic ratio or either side of unity and the basic ratio are subject to the rule that the algebraic sum of reaction/input plus reaction/output speeds is always unity. For example, in FIG. 1 there are two intermediate ratios between the basic ratio of 0.618 and unity, the primary reaction sun 15 is driven via the secondary train acting as a solar reduction gear when coupled to the inlet or as a planetary reduction gear recirculating power from the outlet. If the secondary train annulus/sun ratio is R, then the solar reduction gear reaction/input speed is R/R+1 and the planetary reduction gear reaction/output speed is 1/R+1 and the algebraic sum of these two ratios is therefore unity.

This rule also applies to the 4-speed unit of FIG. 4 and the 6 and 8 speed units of FIGS. 6 and 8.

It is claimed:

1. A planetary gear unit comprising a plurality of inter-connected co-axial three element planetary gear trains (12, 13) each including a sun (15, 19) a planet carrier (17, 21) and an annulus (14, 18), said gear unit being characterized in that:
   (i) one (12) of said planetary gear trains is a dominant train with a first element (14) permanently connected for rotation with an input member (10) of the unit and a second element (17) permanently connected for rotation with an output member (11) of the unit,
   (ii) a remaining train or trains (13) of the unit are connected with a third element (15) of said dominant train to vary, by the use of associated clutches (C1, C2, C3, C4) acting between elements of said trains and ground, a direction and speed of rotation of said third element (15), thus providing a number of overall gear ratios from the unit, and
   (iii) no further elements of said planetary gear trains (12, 13) are permanently connected for rotation with said input member (10) or said output member (11).

2. A planetary gear unit according to claim 1 characterized in that one element (21) of said remaining train or trains (13) is connected with the third element (15) of the dominant train (12) and the other two elements (18, 19) of said remaining train or trains (13) are selectively clutchable to ground (22) or an element (14, 17) of another train.

3. A planetary gear unit according to claims 1 or 2 characterized in that the third element (15) of the dominant train (12) is connected with a first element (21) of a second train (13), a first clutch (C1) is provided for clutching a second element (18) of the second train to ground (22), a second clutch (C2) is provided for clutching a third element (19) of the second train to ground, a third clutch (C3) is provided for clutching one of the second and third elements (18, 19) of the second train to one of the input and output members (10, 11) and a fourth clutch (C4) is provided for clutching the other of the second or third elements (18, 19) of the second train to the other of the input or output members (10, 11), the arrangement being such that a first ratio is provided from the unit when said first (C1) and second (C2) clutches are engaged, a second ratio is provided when said first (C1) and third (C3) clutches are engaged, a third ratio is provided when the said second (C2) and fourth (C4) clutches are engaged and a fourth ratio is provided when said third (C3) and fourth (C4) clutches are engaged.

4. A planetary gear unit according to claim 3 characterized in that the annulus (14) of the dominant train (12) is connected with one of the input and output members (10, 11), the carrier (17) of the dominant train (12) is connected to the other of the input and output members (10, 11), and the sun (15) of the dominant train is connected to an element (21) of the second train (13).

5. A planetary gear unit according to claim 4 characterized in that the sun (15) of the dominant train (12) is connected to the carrier (21) of the second train (13).

6. A planetary gear unit according to claim 4 characterized in that the sun (15) of the dominant train (12) is connected with the sun (19) of the second train (13).

7. A planetary gear unit according to claim 5 characterized in that the first clutch (C1) clutches the annulus (18) of the second train (13) to ground (22), the second clutch (C2) clutches the sun (19) of the second train (13) to ground (22), the third clutch (C3) clutches the sun (19) of the second train to the input or output member (10, 11) connected with the carrier (17) of the dominant train (12), and the fourth clutch (C4) clutches the annulus (18) of the second train to the input or output member (10, 11) connected to the annulus (14) of the dominant train (12).

8. A planetary gear unit according to claim 6 characterized in that the first clutch (C1) clutches the carrier (21) of the second train (13) to ground, the second clutch (C2) clutches the annulus (18) of the second train to ground, the third clutch (C3) clutches and annulus (18) of the second train to the output or input member (11, 10) connected with the carrier (17) of the dominant train (12), and the fourth clutch (C4) clutches the carrier (21) of the second train to the input or output member (10,11) connected to the annulus (14) of the dominant train (12).

9. A planetary gear unit according to claim 8 characterized in that the other clutch (C2, C1) of each pair is applied by fluid pressure.

10. A planetary gear unit according to claim 1 characterized in that the clutches (C1, C2, C3, C4) are grouped together in two pairs (C1, C4:C2, C3), one clutch (C3, C4) of each pair being spring-applied and automatically released when the other clutch (C2, C1) of the pair is applied to provide a full powershift capability allowing ratio changes under full power.

11. A planetary gear unit according to claim 1 or claim 2 characterized in that the annulus (102) of the dominant train (100) is connected to one of the input and output members (10, 11), the carrier (103) of the dominant train is connected to the other of the input and output members (10, 11), the sun (101) of the dominant train is connected to the sun (201) of a second train (200) and the sun (301) of a third train (300), and the annulus (202) of the second train is connected to an element (303) of the third train, clutches being provided for clutching the carriers (203, 303) and annuli (202, 203) of the second and third trains alternatively to ground or to one of the input and output members (10, 11) to provide a six-speed unit.

12. A planetary gear unit according to claim 11 characterized in that a fourth train (400) is provided, the fourth train being of reversed star form with its carrier (403) connected to the carrier (203) of the second train (200) and the sun (401) of the fourth train connected to the annulus (202) of the second train, additional clutches (C7, C8) being provided for clutching the annulus (402) and carrier (403) of the fourth train to ground or to one of the input and output members (10, 11) to provide an eight speed unit.

13. A planetary gear unit comprising:
  a rotatable input member;
  a rotatable output member;
  a first planetary gear assembly including a first element connected to said input member, a second element connected to said output member, and a third element, rotation of said output member being controlled in a direction and speed relative to rotation of said input member solely in response to operation of said third element of said first planetary gear assembly;
  a second planetary gear assembly including a first element, a second element, and a third element, at least one of said first, second, and third elements of said second planetary gear assembly being connected to said third element of said first planetary gear assembly; and
  means for selectively operating at least one of said first, second, and third elements of said second planetary gear assembly so as to control said operation of said third element of said first planetary gear assembly and, therefore, said direction and speed of rotation of said output member relative to rotation of said input member.

* * * * *